Sept. 16, 1958
H. MICKEL
2,852,313
APPARATUS AND METHOD FOR REMOVING REFUSE
Filed July 28, 1955
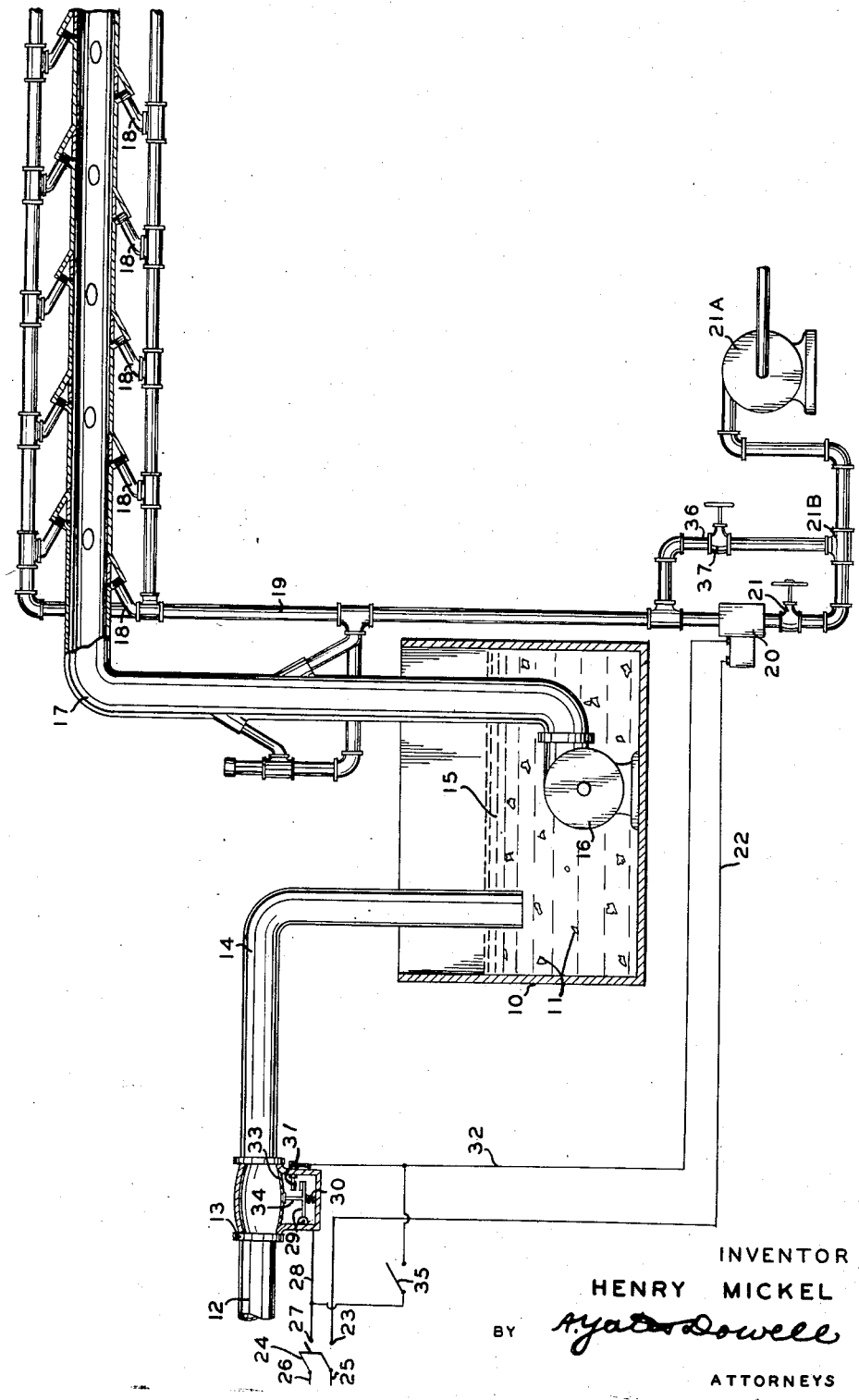
INVENTOR
HENRY MICKEL
BY *A. Yates Dowell*
ATTORNEYS United States Patent Office 2,852,313
Patented Sept. 16, 1958

2,852,313

APPARATUS AND METHOD FOR REMOVING REFUSE

Henry Mickel, Boonville, Ind.

Application July 28, 1955, Serial No. 524,837

5 Claims. (Cl. 302—14)

The present invention relates to the removal of waste material particularly crushed waste material resulting from the treatment of coal.

Heretofore waste material consisting largely of crushed rock, iron and stone has been removed from coal and transferred to refuse piles. Such foreign material has been removed by being crushed to relatively small sizes of material up to 6″ and dumped into a tank, the tank being continuously supplied with water under pressure to keep the material in suspension and such suspended material along with the liquid being pumped through a conduit which may be a 10″ pipe to a disposal dump where the material settles and the water may be reused. Frequently the material in the refuse includes drill bits and even 16 pound sledge hammer heads have been found in such refuse.

Although this liquid treatment has been satisfactory for removing the foreign material, it has not been satisfactory when the supply of water to the tank is interrupted for any reason. The interruption of the water supply causes the material, particularly the fine clay, to become impacted in the discharge conduit and such impacted material remains in the conduit until the conduit is disassembled and cleaned out, this cleaning being extremely difficult because the material collects in hard formations which approach the density of cement. Consequently the interruption in the supply of water to the tank resulted in blocking the discharge conduit and the equipment could not be used until the discharge conduit was cleaned out to be again usable. The discharge conduits have been clogged by the refuse material, particularly the fine clay when the supply of water has been interrupted for even a relatively short time which time may be less than a minute, and therefore the refuse disposal systems prior to the present invention have not been satisfactory.

An object of the present invention is to overcome the above difficulties and provide an apparatus and a method which will assure the continuity of the removal of the refuse material from the collection tank.

Another object of the invention is to provide automatic operation of equipment to prevent impaction of the material in the conduit in the event of failure of the supply of fluid to the tank.

Another object of the invention is to provide an effective disposal system for transferring material from one location to a location at a distance therefrom.

Other and further objects will be apparent as the description proceeds and upon reference to the accompanying drawing wherein the single figure diagrammatically illustrates the apparatus and method for handling and disposing of waste material with parts being shown in section.

Briefly stated, the present invention relates to material handling equipment and includes a tank in which refuse material is collected with a source of primary high pressure liquid providing a stream arranged to continuously agitate the material in the tank while a pump is provided to remove the suspended material and fluid through a conduit to a location at a distance. A plurality of jets are arranged to direct additional fluid or liquid into the conduit to assist in preventing impaction of the solid material in the event of failure of the supply of agitating fluid into the tank. An automatic control responsive to failure of flow of liquid in the pressure supply to the tank immediately opens a valve from a secondary source of high pressure liquid connected to the jets to cause the liquid from the secondary source to impinge on the material within the conduit and keep the conduit open preventing impaction of the material therein.

A tank 10 is arranged to receive waste material 11 such as crushed iron, stone and other foreign material up to 6″ size which may be removed from coal, such material being referred to as "glob" and the tank referred to as a "glob tank." Water is supplied from a primary source of water pressure through a conduit 12, a flow responsive control unit 13 and a conduit 14 to the tank 10, thereby continuously agitating the foreign material therein. Water in tank 10 is agitated by the rapid flow from conduit 14 keeping the refuse material 11 in suspension in the water 15, so that the liquid suspension drawn into the pump 16 will have sufficient water to prevent the solid material from impacting in the conduit 17.

The water 15 with the refuse material 11 therein is removed from tank 10 by means of a pump 16 which draws the water and the foreign material from the tank 10 forcing the water and the suspended foreign material through "glob line" or conduit 17, such suspended foreign material and water passing through the conduit 17 to a refuse pile at the banks of a lake at any convenient location, the water being separated from the refuse and settling in the lake for reuse. In ordinary circumstances when the supply of water through the conduits 12, 14 is continuous, the power driven pump 16 continuously removes the liquid with the suspended foreign material satisfactorily, but in the event of failure of the supply of water through the conduit 14, the solid material immediately begins to impact in the conduit 17 completely clogging such conduit. Consequently, merely restoring the flow of water through the conduit 14 does not open the conduit 17 because the impacted material remains in the conduit and a great deal of delay occurs while the workmen remove the impacted material from the conduit 17.

To avoid this problem, a plurality of nozzles or jets 18 are arranged in spaced longitudinal relation along the conduit 17 where impaction may occur, the discharge ends of the jets extending in the direction of flow of the liquid and suspended material and these nozzles are supplied with high pressure liquid from a secondary source through a pipe 19 having a solenoid controlled normally closed valve 20 and a conventional shut-off valve 21. The jets or nozzles 18 may be provided at various locations along the conduit 17 and are preferably located along the top and sides of horizontally extending portions of the conduit to prevent settlement of the fine material in the nozzles. However, suitable flapper valves may be provided on certain of the nozzles such as those located at the lower portion of the conduit 17 to prevent the material from settling in the nozzle orifices, such flapper valves being opened by the pressure of the water from the secondary supply and being closed by a spring, gravity or the like. The secondary source of high pressure liquid is obtained from a supply entirely independent of the primary supply through a pump 21A and a conduit 21B connecting the pump 21A to the inlet end of shut-off valve 21.

The solenoid valve 20 is supplied with electrical energy through electrical conductor 22 connected to a terminal 23 of a single throw double pole switch 24 connected to electric supply lines 25 and 26. Another terminal 27 of the switch 24 is connected by a lead 28 to a pivoted contact 29 which is urged by a spring 30 to closed position with relation to a fixed contact 31 which is connected by a conductor 32 to the other terminal of the solenoid controlled valve 20, thereby completing a circuit when the movable contact 29 is in engagement with fixed contact 31. Normally water under pressure passing through conduit 12 maintains pressure on a diaphragm 33 of the flow control device 13 and urging a rod 34 connected to the movable connection 29 and moving the contact 29 out of engagement with the fixed contact 31 against the bias of the spring 30, thereby maintaining the circuit open, the solenoid controlled valve 20 remaining closed when the circuit is open. However, immediately upon failure of the supply of water in conduit 12 the diaphragm 33 will be released of pressure and the bias of spring 30 will cause movable contact 29 to engage fixed contact 31, thereby completing the circuit and opening solenoid controlled valve 20, thereby causing liquid from the secondary source under pressure to be forced out of nozzles 18 into the conduit 17 causing the material therein to be forced through the conduit 17 even though the liquid 15 is no longer supplied to the tank 10.

It will be apparent that the shut-off valve 21 will be opened and that the switch 24 will be closed when the disposal system is placed in operation.

In some circumstances it may be desirable to increase the flow of liquid through the conduit 17 and this may be accomplished by the provision of a manual switch 35 connected across conductors 28 and 32 so that the solenoid of valve 20 may be energized and the solenoid valve 20 opened regardless of the liquid pressure in primary conduit 12.

Alternately a by-pass conduit 36 may be provided from the secondary supply conduit 21B to pipe 19 controlled by a manually adjustable flow valve 37, the valve 37 being adjusted to provide additional liquid under pressure through the nozzles 18 to the discharge conduit 17. This control may be adjusted to the most advantageous arrangement and provides for great flexibility in the operation of the apparatus.

From the above description the operation is believed to be clear including the method which comprises continuously supplying a high pressure stream of liquid to the collection tank while discharging fine foreign material into the tank and then removing the liquid and the fine suspended material by means of a pump and conducting the suspended material through a conduit. Immediately upon failure of the stream of liquid in the tank, a secondary supply of water will be forced through the nozzles into the discharge conduit to assure that blockage of the discharge conduit cannot occur.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for facilitating the disposal of fine solid material comprising a tank in which the fine material may be collected, a source of high pressure liquid in communication with the tank providing a main supply of liquid for maintaining the fine material in suspension, a pump in communication with said tank, a conduit extending from said pump to a point of disposal, means to operate said pump to draw the liquid and suspended material from the tank and force the same into a conduit, a plurality of jets arranged in spaced relation along the conduit with the nozzles of said jets extending generally in the direction of flow of the liquid and suspended material, means to supply high pressure liquid to said nozzles, control means for controlling the high pressure liquid to said nozzles and means responsive to a reduction in pressure of said main supply of liquid to cause said control means to open so that the high pressure liquid may pass through the control means and into the jets to prevent impacting of the material in said conduit.

2. Apparatus for transferring fine material comprising a tank open to the atmosphere for the admission of fine material, a primary water supply directed into said tank for agitating and maintaining the fine material in an agitated and suspended condition in the water, conduit means extending from said tank to a dump for receiving the water and the suspended material from the tank, a plurality of nozzles arranged in said conduit and arranged to direct liquid into said conduit in the direction of flow therethrough, and a secondary source of high pressure water connected to said nozzles and means to control the supply of secondary water to said nozzles in the event the primary water supply fails.

3. Apparatus for transferring fine material comprising a tank in which the fine material may be received, a primary water supply directed into said tank for maintaining the fine material in an agitated and suspended condition in the water, conduit means extending from said tank to a dump for receiving water and the suspended material from the tank, a plurality of nozzles arranged in said conduit and arranged to direct liquid into said conduit in the direction of flow therethrough, a secondary source of high pressure water connected to said nozzles, means to control the supply of secondary water to said nozzle, a flow responsive control is arranged in operative relation to the supply of water to said tank, means interconnecting said flow responsive control and the control means for said secondary water supply to immediately operate said control for said secondary supply when the flow of water in said primary supply is interrupted, whereby water will be supplied to the nozzles and maintain the conduit open.

4. Apparatus for transporting relatively small particulate material comprising a tank for collecting the material, a first source of fluid under pressure continuously passing into the tank for agitating the material, a pump connected with the tank for moving the material from the tank to a point of disposal, a closed conduit extending from said pump to said point of disposal, a plurality of jets projecting into said conduit in spaced relation along the conduit, a second source of fluid under pressure connected to said jets, means responsive to a reduction in pressure in said first source of fluid under pressure to cause said second source of pressure to cause fluid to flow into said conduit through said jets whereby compacting of said particulate material in said conduit is avoided.

5. Apparatus for moving crushed material comprising a collection tank for directly receiving crushed material, means to supply a primary liquid to the crushed material from a source, pump means to remove the crushed material and primary liquid from the tank, a conduit extending from said pump to a point of disposal, means to supply secondary high pressure liquid to said conduit at points spaced from said pump in sufficient quantity to assist in the movement of the crushed material for maintaining a continuous flow of the crushed material through the discharge conduit and means for increasing the quantity of secondary liquid in the event of failure of the supply of primary liquid.

References Cited in the file of this patent

UNITED STATES PATENTS

| 1,329,967 | Greenstreet | Feb. 3, 1920 |
| 1,466,413 | Schaanning | Aug. 28, 1923 |
| 2,718,717 | Collins | Sept. 27, 1955 |

FOREIGN PATENTS

| 25,851 | Great Britain | Nov. 28, 1904 |